(12) United States Patent
Wang et al.

(10) Patent No.: US 11,664,846 B1
(45) Date of Patent: May 30, 2023

(54) APPARATUS AND METHOD OF CHOOSING WORKING FREQUENCY POINTS

(71) Applicant: Beken Corporation, Shanghai (CN)

(72) Inventors: Weifeng Wang, Shanghai (CN); Yiming Huang, Shanghai (CN)

(73) Assignee: Beken Corporation, Shanghai (CN)

( * ) Notice: Subject to any disclaimer, the term of this patent is extended or adjusted under 35 U.S.C. 154(b) by 24 days.

(21) Appl. No.: 17/646,833

(22) Filed: Jan. 3, 2022

(30) Foreign Application Priority Data

Dec. 17, 2021 (CN) .......................... 202111553002.X

(51) Int. Cl.
H04B 1/7143 (2011.01)
H04W 4/80 (2018.01)
H04W 72/0453 (2023.01)
H04L 27/26 (2006.01)
H04W 72/541 (2023.01)
H04W 72/542 (2023.01)
H04B 1/715 (2011.01)

(52) U.S. Cl.
CPC ....... *H04B 1/7143* (2013.01); *H04L 27/2657* (2013.01); *H04W 4/80* (2018.02); *H04W 72/0453* (2013.01); *H04W 72/541* (2023.01); *H04W 72/542* (2023.01); *H04B 2001/7154* (2013.01)

(58) Field of Classification Search
CPC ................. H04B 1/3805; H04B 1/713; H04B 2001/7154; H04L 27/2657; H04W 4/80; H04W 72/541; H04W 72/542; H04W 72/0453
See application file for complete search history.

(56) References Cited

U.S. PATENT DOCUMENTS

2010/0046677 A1* 2/2010 Ganeshan ............... H03F 3/193
375/345

* cited by examiner

*Primary Examiner* — Rahel Guarino
(74) *Attorney, Agent, or Firm* — Schwegman Lundberg & Woessner, P.A.

(57) ABSTRACT

A Bluetooth receiver includes a primary circuit path, which can create a first digital IF modulated signal to obtain a Bluetooth load signal at a current Bluetooth frequency point, and an auxiliary circuit path, in parallel with the primary circuit path, which can create a second digital IF modulated signal in a Bluetooth frequency range across multiple Bluetooth frequency points. A signal analysis module of the auxiliary circuit path may evaluate interference levels of the second digital IF modulated signal at the Bluetooth frequency points, by analyzing a Fourier Transformation (FT) spectrum of the second digital IF modulated signal, and to choose a number of working Bluetooth frequency points corresponding to relative low signal strengths in the FT spectrum. This way may efficiently and quickly choose qualified working Bluetooth frequency points for Adaptive Frequency Hopping (AFH) in a single current time slot, without consuming any additional time slots for detection.

20 Claims, 3 Drawing Sheets

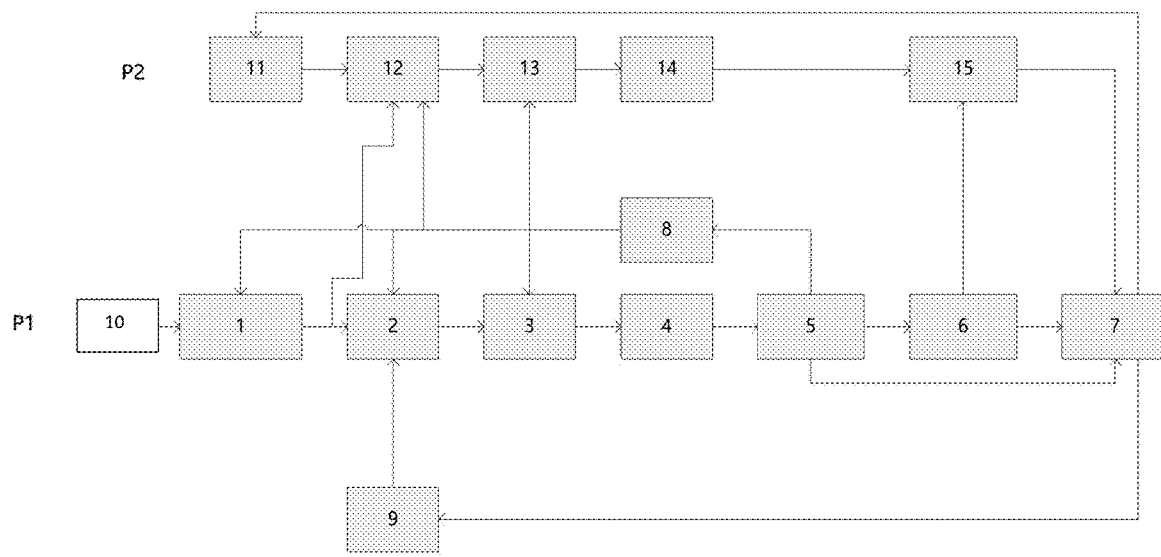
FIG. 1
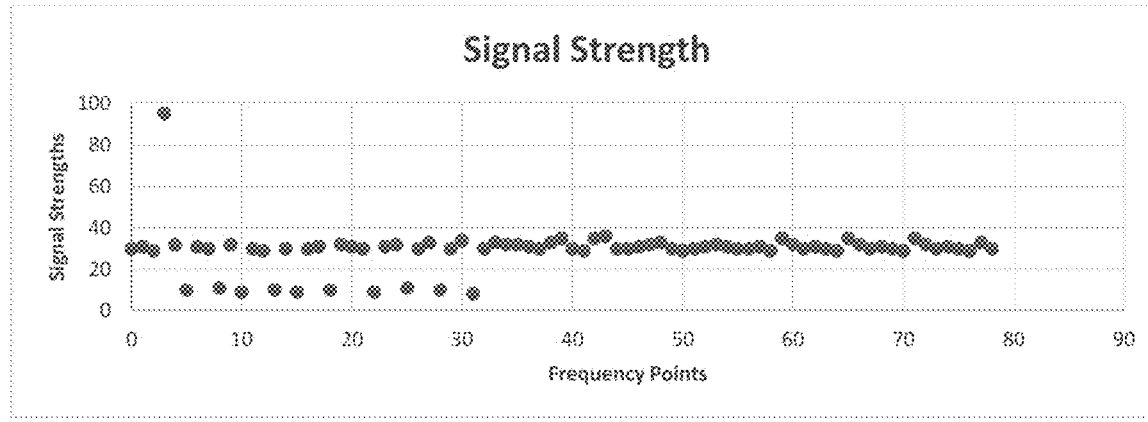
FIG. 2
| Frequency Point | 5 | 8 | 10 | 13 | 15 | 18 | 22 | 25 | 28 | 31 |
FIG. 3

APPARATUS AND METHOD OF CHOOSING WORKING FREQUENCY POINTS

CROSS REFERENCE TO RELATED APPLICATIONS

This application claims priority to and incorporates by reference Chinese Patent Application No. 202111553002.X filed Dec. 17, 2021.

TECHNICAL FIELD

The present application relates to choosing working frequency points for a wireless communication device, and more particularly an apparatus and a method of choosing working Bluetooth frequency points for a Bluetooth device.

BACKGROUND

Nowadays, widely used wireless communications can be vulnerable to interferences from other sources in the air. In a commonly used frequency band (e.g., 2.4 GHz), nearby wireless communication devices (such as Bluetooth and Wi-Fi devices) may interfere with each other, and thus the quality and throughput of the wireless communications of the wireless communication devices can be affected. Approaches may be adopted to improve anti-interference capabilities of the wireless communication devices. For example, Bluetooth devices may adopt an Adaptive Frequency Hopping (AFH) technology to improve their anti-interference capabilities against interferences from nearby Wi-Fi devices or other Bluetooth devices. A technology to quickly find and choose working frequency points that can be used by the Bluetooth devices for AFH is required.

BRIEF DESCRIPTION

According to an embodiment, a Bluetooth receiver comprises: a primary circuit path (P1) comprising: a low noise amplifier (LNA) to amplify a radio frequency (RF) modulated signal including a Bluetooth signal, a first mixer, a first Intermediate Frequency (IF) filter and amplifier, a first A/D converter, a digital filter and demodulator, a synchronizer and depacketizer, and an adaptive frequency selector connected in series; wherein the primary circuit path creates a first digital IF modulated signal to obtain a Bluetooth load signal at a current Bluetooth frequency point during a current time slot; and an auxiliary circuit path, in parallel with the primary circuit path, comprising: a second mixer connected to the LNA, a second IF filter and amplifier, a second A/D converter, a signal analysis module connected in series; wherein the auxiliary circuit path creates a second digital IF modulated signal in a Bluetooth frequency range including multiple Bluetooth frequency points, and wherein the signal analysis module evaluates interference levels of the second digital IF modulated signal at the Bluetooth frequency points to choose a number of working Bluetooth frequency points from the Bluetooth frequency points to obtain an Adaptive Frequency Hopping (AFH) channel mapping table.

According to an embodiment, a method of choosing working Bluetooth frequency points for a Bluetooth receiver comprising a primary circuit path and an auxiliary circuit path, comprises: receiving, by a second mixer of an auxiliary circuit path from a LNA of the primary circuit path, an amplified RF modulated signal; creating, by the auxiliary circuit path, a second digital IF modulated signal in a Bluetooth frequency range including multiple Bluetooth frequency points by processing the amplified RF modulated signal; obtaining, by the signal analysis module of the auxiliary circuit path, a Fourier Transformation (FT) spectrum of the second digital IF modulated signal; evaluating, by the signal analysis module, interference levels respectively at the multiple Bluetooth frequency points by analyzing the FT spectrum to evaluate signal strengths of the second digital IF modulated signal respectively at the multiple Bluetooth frequency points; ranking, by the signal analysis module, the Bluetooth frequency points based on the interference levels at the Bluetooth frequency points from low to high; and choosing, by the signal analysis module, a predetermined number of working Bluetooth frequency points from the ranked Bluetooth frequency points having relatively low signal strengths to output to the primary circuit path.

BRIEF DESCRIPTION OF THE DRAWINGS

Non-limiting and non-exhaustive embodiments of the present application are described with reference to the following figures, wherein like reference numerals refer to like parts throughout the various views unless otherwise specified.

FIG. 1 is a diagram illustrating a Bluetooth receiver (100) according to an embodiment.

FIG. 2 is a diagram illustrating a Fourier transformation (FT) spectrogram (200) of signals in the air within a Bluetooth frequency range according to an embodiment.

FIG. 3 is an AFH channel mapping table (300) illustrating a list of working Bluetooth frequency points that can be used by a Bluetooth receiver for AFH according to an embodiment.

DETAILED DESCRIPTION OF THE ILLUSTRATED EMBODIMENTS

Figure 4:
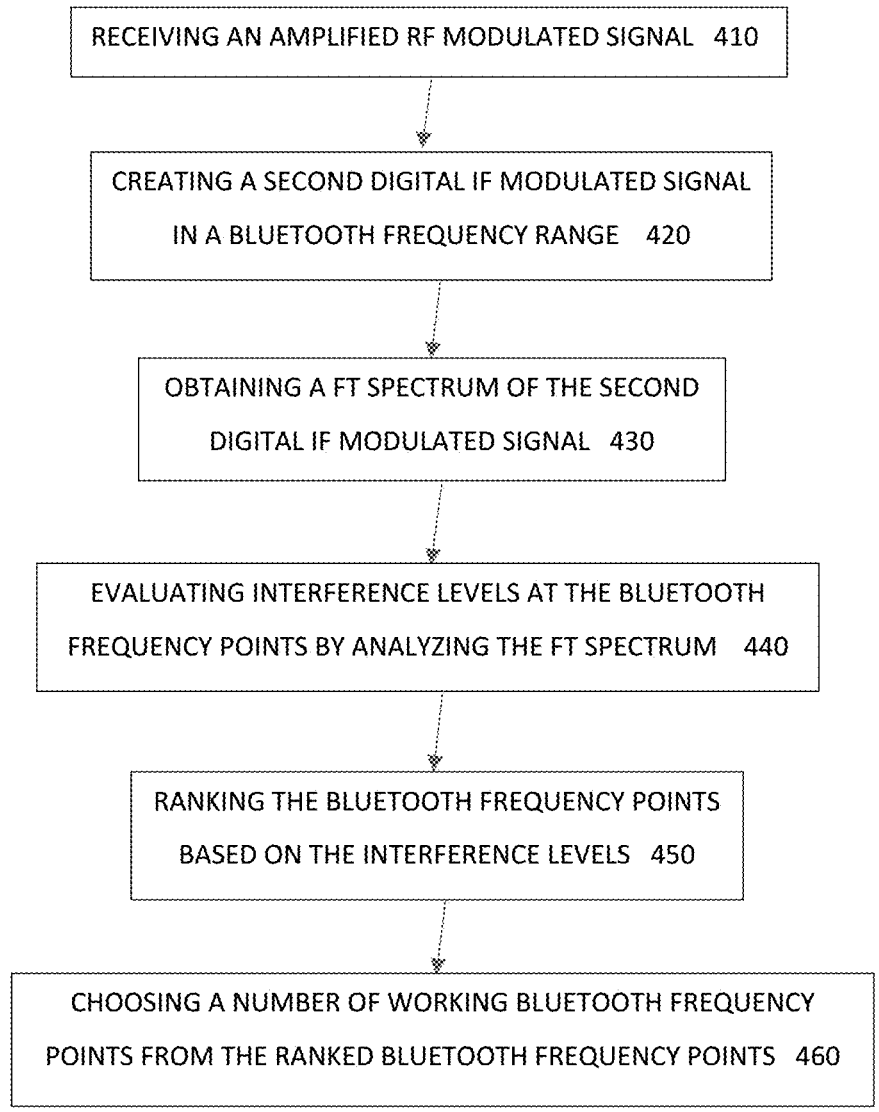
FIG. 4 is a flow chart illustrating a method (400) of choosing working Bluetooth frequency points for a Bluetooth receiver according to an embodiment.

Various aspects and examples of the application will now be described. The following description provides specific details for a thorough understanding and enabling description of these examples. Those skilled in the art will understand, however, that the application may be practiced without many of these details.

Additionally, some well-known structures or functions may not be shown or described in detail, so as concise purpose and to avoid unnecessarily obscuring the relevant description.

The terminology used in the description presented below is intended to be interpreted in its broadest reasonable manner, even though it is being used in conjunction with a detailed description of certain specific examples of the application. Certain terms may even be emphasized below, however, any terminology intended to be interpreted in any restricted manner will be overtly and specifically defined as such in this Detailed Description section.

Without loss of generality, reference will be made to illustrative embodiments by taking a Bluetooth receiver and a method of choosing working Bluetooth frequency points for the Bluetooth receiver as example. Those of ordinary skills in the art understand that this is only to describe the application clearly and adequately, rather than limit the scope of the application, which is defined by the appended claims.

The term "Bluetooth frequency point" of a Bluetooth receiver represents a designation or label number (e.g., 2) associated with a Bluetooth frequency (e.g., 2404 MHz) of a Bluetooth channel (e.g., Bluetooth channel 2) of the Bluetooth receiver. A Bluetooth frequency point uniquely corresponds to a Bluetooth channel and a Bluetooth frequency.

The terms "Bluetooth center frequency" and "Bluetooth frequency" of a Bluetooth channel can be used interchangeably in this description.

In an Industrial, Scientific, and Medical (ISM) frequency band (e.g., 2.4 GHz, commonly used by Bluetooth and Wi-Fi devices), nearby Wi-Fi devices and Bluetooth devices may interfere with each other, and nearby Bluetooth devices may also interfere with each other, thus seriously affecting the quality and throughput of the Bluetooth communications of the Bluetooth devices.

FIG. 1 is a diagram illustrating a Bluetooth receiver 100 according to an embodiment. The Bluetooth receiver 100 may include two circuit paths, for example, a primary or main circuit path P1 and an auxiliary or secondary circuit path P2 that is arranged in parallel with the primary circuit path P1.

For example, the primary circuit path P1 of the Bluetooth receiver 100 may perform functions of a regular Bluetooth receiver (e.g., a Bluetooth speaker) using the AFH technology. The Bluetooth speaker may play a music in a series of time slots. The Bluetooth speaker may play in a current time slot Tc (e.g., T5) at a current Bluetooth frequency point Fe (e.g., 3) for a time width (e.g., 1.25 ms). After the current time slot Tc, at the next time slot Tn (e.g., T6), the Bluetooth speaker will perform AFH to hop from the current Bluetooth frequency point Fe to a next Bluetooth frequency point Fn (e.g., 5), which needs to be known beforehand so that the Bluetooth speaker will know where to hop at the next time slot Tn.

In an embodiment, in the current time slot Tc (e.g., T5), while the primary circuit path P1 working at the current Bluetooth frequency point Fe (e.g., 3 chosen from 0-78), the auxiliary circuit path P2 may detect interference levels caused by interfering signals (such as Wi-Fi signals or other Bluetooth signals) in the air at each of the entire 79 Bluetooth frequency points F (e.g., 0-78), except the current Bluetooth frequency point Fc (e.g., 3), by using a FT spectrogram of the signals received in the air, without consuming additional nine slots other than the current time slot Tc. In this way, the auxiliary circuit path P2 may effectively and quickly choose working Bluetooth frequency points for a number of following time slots after the current time slot Tc in a single current time slot Tc.

In an embodiment, the primary circuit path PI of the Bluetooth receiver 100 may include a Low Noise Amplifier (LNA) 1, a first mixer 2, a first Intermediate Frequency (IF) filter and amplifier 3, a first Analog Digital Converter (ADC) 4, a digital filter and demodulator 5, a synchronization and unpacking module 6, an adaptive frequency selection module 7, an Auto Gain Control (AGC) 8, and a frequency synthesizer 9.

The LNA1 may amplify a RF modulated signal that can be received by an antenna 10 for example, and may output an amplified RF modulated signal.

The first mixer 2 may mix the amplified RF modulated signal and a Local Oscillation (LO) signal created by the frequency synthesizer 9, and may output an IF modulated signal. The first IF filter and amplifier 3 may filter the IF modulated signal to suppress out-of-band interferences, may amplify the filtered IF modulated signal in order to meet the input requirements of the first ADC 4, and may output an amplified and filtered IF modulated signal. For example, the first IF filter and amplifier 3 may filter the IF modulated signal and output an amplified IF modulated signal at the current Bluetooth frequency point Fe (e.g., 3). The first IF filter and amplifier 3 may create the first digital IF modulated signal at the current Bluetooth frequency point Fc during the current time slot Tc (e.g., T5).

The first ADC 4 may convert the amplified and filtered IF modulated signal at the current Bluetooth frequency point Fe into a digital modulated signal, and may output the digital modulated signal.

The digital filter and demodulator 5 may filter the digital modulated signal, and may demodulate the digital modulated signal to obtain a demodulated signal to be output to the AGC 8 and the adaptive frequency selection module 7. The digital filter and demodulator 5 may perform signal demodulation and frame processing.

The AGC 8 may automatically adjust gains of the LNA1, the first mixer 2, and first the IF filter and amplifier 3 in order to meet digital demodulation requirements of the digital filter and demodulator 5. The synchronization and unpacking module 6 may synchronize the demodulated signal to obtain a packet signal, and may unpack the packet signal to obtain a load or a payload signal to play music for example.

The adaptive frequency selection module 7 may detect an interference level at the current Bluetooth frequency point (or the current Bluetooth channel) that is used by the Bluetooth receiver 100, may evaluate the quality of the current Bluetooth frequency point.

The frequency synthesizer 9 may receive a control signal from the adaptive frequency selection module 7 and may produce the LO signal that can be used by the mixer 2.

The auxiliary circuit path P2 may include a second mixer 12, a second IF filter and amplifier 13, a second ADC 14, a signal analysis module 15, and a second frequency synthesizer 11, that can be independent from the primary circuit path P1. The auxiliary circuit path P2 may reuse the LNA 1 and the AGC 8 of the primary circuit path P1.

The second mixer 12 of the auxiliary circuit path P2 may mix the amplified RF modulated signal output by the LNA1 of the primary circuit path P1 and a second LO signal created by the second frequency synthesizer 11, and may output a second IF modulated signal.

The auxiliary circuit path P2 and the primary circuit path P1 may use a consistent gain control configuration, which is controlled synchronously by the AGC 8.

The second frequency synthesizer 11 of the auxiliary circuit path P2 may receive a control signal from the adaptive frequency selection module 7 of the primary circuit path P1, and may create the LO signal that can be used by the second mixer 12.

The second IF filter and amplifier 13 of the auxiliary circuit path P2 may filter the second IF modulated signal to filter off signals out of the Bluetooth frequency range, retaining signals within the Bluetooth frequency range, and may amplify the filtered IF modulated signal in order to meet the input requirements of the second ADC 14 to obtain a second amplified and filtered IF modulated signal. The Bluetooth frequency range (e.g., between 2400-2480 MHz) may include 79 Bluetooth frequency points (e.g., 0-78) corresponding to 79 Bluetooth channels 0-78). The second IF filter and amplifier 13 may filter the second IF modulated signal and output a second amplified IF modulated signal working within the Bluetooth frequency range, across all 79 Bluetooth frequency points (e.g., 0-78).

The second ADC 14 of the auxiliary circuit path P2 may convert the second amplified and filtered IF modulated signal working at all the Bluetooth frequency points into a second digital modulated signal, and may output the second digital modulated signal.

The signal analysis module 15 of the auxiliary circuit path P2 may split and sample the second digital modulated signal at a sample rate (e.g., 80 MHz), obtain a FT spectrogram of the second digital modulated signal for a frame every microsecond, and thus obtain signal strength values across all 79 Bluetooth frequency points (e.g., 0-78) including the current working Bluetooth frequency point (e.g., 3).

FIG. 2 is a diagram illustrating a FT spectrogram 200 of signals in the air within a Bluetooth frequency range received by an auxiliary path P2 of the Bluetooth receiver 100 according to an embodiment.

The signal strength values of the second digital IF modulated signal and the interference levels respectively at all the Bluetooth frequency points (e.g., 0-78) except the current Bluetooth frequency point (e.g., 3) are proportional. The signal analysis module 15 may thus evaluate interferences at all Bluetooth frequency points except the current Bluetooth frequency point Fc during the current time slot Tc (e.g., T5). In this way, the signal analysis module 15 may evaluate the Bluetooth frequency points except the current Bluetooth frequency point to determine and choose a number (e.g., 10) of qualified working Bluetooth frequency points that can be used for by the Bluetooth receiver 100 for AFH based on the signal strength values at all the Bluetooth frequency points except the current Bluetooth frequency point Fe in the FT spectrum 200.

FIG. 3 is an AM channel mapping table 300 illustrating a list of working Bluetooth frequency points that can be used by the Bluetooth device for AFH according to an embodiment. The AFH channel mapping table 300 can record the number (e.g., 10) of qualified working Bluetooth frequency points (e.g., 5, 8, 10, 13, 15, 18, 22, 25, 28, 31) that can be used by the Bluetooth receiver 100 for AFH.

Below is an example to show how the Bluetooth receiver 100 may determine or choose the number of working Bluetooth frequency points within a single current time slot Tc with reference to FIGS. 1-3.

As shown in FIG. 1, the Bluetooth receiver 100 may include a primary circuit path P1 and an auxiliary circuit path P2 in parallel with the primary circuit path P1. The primary circuit path P1 may produce a first digital IF modulated signal to obtain a Bluetooth load signal at a current Bluetooth frequency point (e.g., 3) during a current time slot Tc (e.g., T5). The auxiliary circuit path P2 may produce a second digital IF modulated signal in a Bluetooth frequency range (e.g., 2402-2480 MHz) across multiple (e.g., 79) Bluetooth frequency points (e.g., 0-78).

As shown in FIG. 2, the signal analysis module 15 of the auxiliary circuit path P2 may evaluate interference levels of the second digital IF modulated signal at the multiple Bluetooth frequency points to choose a number (e.g., 10) of working Bluetooth frequency points from the multiple Bluetooth frequency points in a single current time slot Tc to obtain an AFH channel mapping table.

For example, the signal analysis module 15 may obtain a FT spectrum of the second digital IF modulated signal, analyze the FT spectrum of the second digital IF modulated signal, rank the multiple (e.g., 79) Bluetooth frequency points (e.g., 0-78) based on the corresponding signal strength values at the Bluetooth frequency points from low to high, and choose a number (e.g., 10) of working Bluetooth frequency points (e.g., 5, 8, 10, 13, 15, 18, 22, 25, 28, 31) from the ranked Bluetooth frequency points, which respectively have relative low signal strength values in the FT spectrum 200 of the second digital IF modulated signal.

As shown in FIG. 3, the AFH channel mapping table 300 may record the number (e.g., 10) of working Bluetooth frequency points (e.g., 5, 8, 10, 13, 15, 18, 22, 25, 28, 31), which can be used by the Bluetooth device 100 for AFH in sequency, for the upcoming multiple time slots Ts (e.g., T6-T15) following the current time slot Tc (e.g., T5).

Based on the AFH channel mapping table 300 created during a current time slot Tc (e.g., T5), in the following next 10 time slots (e.g., T6-T15), the Bluetooth device 100 will hop in turn to the working Bluetooth frequency points (e.g., 5, 8, 10, 13, 15, 18, 22, 25, 28, 31) listed in the AFH channel mapping table 300. For example, at time slot T6, the Bluetooth device 100 will hop from the current Bluetooth frequency point 3 to the Bluetooth frequency point 5; at time slot 17, the Bluetooth device 100 will hop from the Bluetooth frequency point 5 to the Bluetooth frequency point 8, and at time slot 18, the Bluetooth device 100 will hop from the Bluetooth frequency point 8 to the Bluetooth frequency point 10, and so on.

FIG. 4 is a flow chart illustrating a method 400 of choosing working frequency points for a Bluetooth receiver 100 according to an embodiment. As explained above, referring to FIG. 1, the Bluetooth receiver 100 may include the primary circuit path P1 and the auxiliary circuit path P2 that is arranged in parallel with the primary circuit path P1, and may operate in a Bluetooth frequency range (e.g., 2402-2480 MHz) across multiple (e.g., 79) Bluetooth frequency points or channels (e.g., 0-78), for example.

In an embodiment, at 410, receiving, by the second mixer 12 of the auxiliary circuit path P2 from the LNA 1 of the primary circuit path P1, an amplified RF modulated signal.

At 420, creating, by the auxiliary circuit path P2, a second digital IF modulated signal in a Bluetooth frequency range including multiple Bluetooth frequency points by processing the amplified RF modulated signal.

At 430, obtaining, by the signal analysis module 15 of the auxiliary circuit path P2 a FT spectrum of the second digital IF modulated signal.

At 440, evaluating, by the signal analysis module 15 of the auxiliary circuit path P2 interference levels respectively at the multiple Bluetooth frequency points by analyzing the FT spectrum to evaluate signal strengths of the second digital IF modulated signal respectively at (or corresponding to) the multiple Bluetooth frequency points.

At 450, ranking, by the signal analysis module 15 of the auxiliary circuit path P2, the Bluetooth frequency points based on the interference levels at the Bluetooth frequency points from low to high.

At 460, choosing, by the signal analysis module 15 of the auxiliary circuit path P2, a predetermined number of working Bluetooth frequency points from the ranked Bluetooth frequency points that have relatively low signal strengths. The chosen predetermined number of working Bluetooth frequency points can be output to the primary circuit path P1.

With respect to FIGS. 1 and 2, as explained above, for example, the signal analysis module 15 may obtain a FT spectrum of the second digital IF modulated signal, analyze the FT spectrum of the second digital IF modulated signal, rank the multiple (e.g., 79) Bluetooth frequency points (e.g., 0-78) based on the corresponding signal strength values at the multiple Bluetooth frequency points from low to high, and choose a number (e.g., 10) of working Bluetooth frequency points (e.g., 5, 8, 10, 13, 15, 18, 22, 25, 28, 31) from the ranked Bluetooth frequency points, which respectively have relative low signal strength values in the FT spectrum 200 of the second digital IF modulated signal.

In an embodiment, the signal strengths of the second digital IF modulated signal and the interference levels respectively at the Bluetooth frequency points, except the current Bluetooth frequency point, are proportional.

In an embodiment, the predetermined number of working Bluetooth frequency points are output from the signal analysis module 15 of the auxiliary circuit path P2 to the adaptive frequency selector 7 of the primary circuit path P1.

In an embodiment, the predetermined number of working Bluetooth frequency points can be recorded in an AFH channel mapping table 300 (as shown in FIG. 3) in the adaptive frequency selector 7 of the primary circuit path P1 (as shown in FIG. 1).

In an embodiment, in the primary circuit path P1, the first IF filter and amplifier 3 may filter the modulated Bluetooth signal to suppress signals out of the current frequency point Fe (e.g., F5) to obtain a filtered modulated Bluetooth signal at the current frequency point.

In an embodiment, in the primary circuit path P1, the digital filter and demodulator 5 may filter and demodulate a digital modulated Bluetooth signal to obtain a demodulated Bluetooth signal to output to the AGC 8 and the adaptive frequency selection module 7.

In an embodiment, in the auxiliary circuit path P2, the second IF filter and amplifier 13 may filter the RF modulated signal to suppress signals out of the Bluetooth frequency range, and thus may obtain a filtered RF modulated signal within the Bluetooth frequency range across multiple Bluetooth frequency points (e.g., 0-78).

In this way, the Bluetooth receiver 100 find and choose efficiently and quickly working Bluetooth frequency points within a single time slot, without need of consuming any further time slots for detection.

Figure 5:
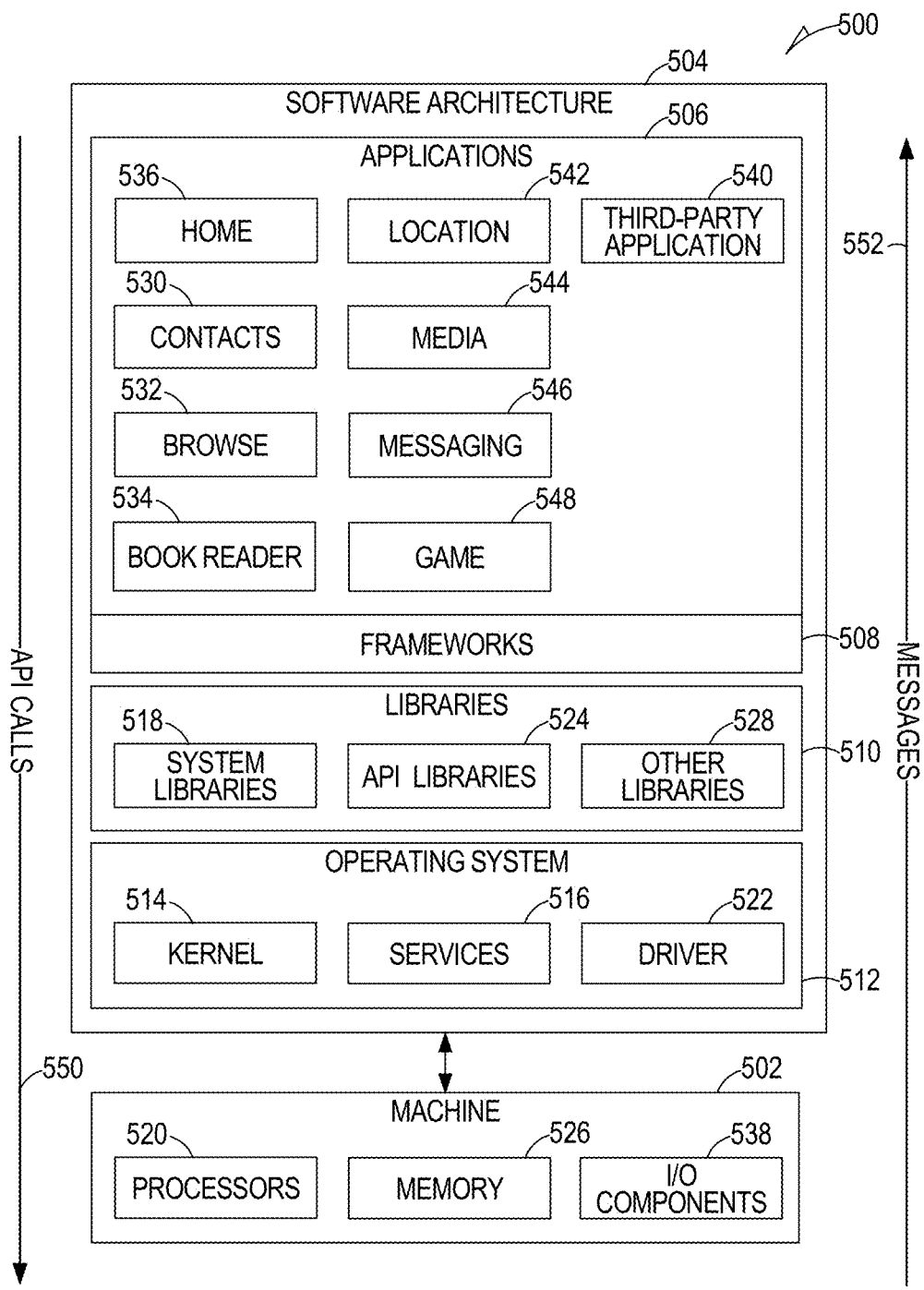
FIG. 5 is a block diagram showing a software architecture (500) within which examples may be implemented.

FIG. 5 is a block diagram 500 illustrating a software architecture 504, which can be installed on a Bluetooth receiver 100 (e.g., on the signal analysis module 15 of the auxiliary circuit path P2 of the Bluetooth receiver 100) described herein.

The software architecture 504 is supported by hardware such as a machine 502 that includes processors 520, memory 526, and I/O components 538. In this example, the software architecture 504 can be conceptualized as a stack of layers, where each layer provides a particular functionality. The software architecture 504 includes layers such as an operating system 512, libraries 510, frameworks 508, and applications 506. Operationally, the applications 506 invoke API calls 550 through the software stack and receive messages 552 in response to the API calls 550.

The operating system 512 manages hardware resources and provides common services. The operating system 512 includes, for example, a kernel 514, services 516, and drivers 522. The kernel 514 acts as an abstraction layer between the hardware and the other software layers. For example, the kernel 514 provides memory management, processor management (e.g., scheduling), component management, networking, and security settings, among other functionalities. The services 516 can provide other common services for the other software layers. The drivers 522 are responsible for controlling or interfacing with the underlying hardware. For instance, the drivers 522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 510 provide a common low-level infrastructure used by the applications 506. The libraries 510 can include system libraries 518 (e.g., C standard library) that provide functions such as memory allocation functions, string manipulation functions, mathematic functions, and the like. In addition, the libraries 510 can include API libraries 524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3) Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 510 can also include a wide variety of other libraries 528 to provide many other APIs to the applications 506.

The frameworks 508 provide a common high-level infrastructure that is used by the applications 506. For example, the frameworks 508 provide various graphical user interface (GUI) functions, high-level resource management, and high-level location services. The frameworks 508 can provide a broad spectrum of other APIs that can be used by the applications 506, some of which may be specific to a particular operating system or platform.

In an example, the applications 506 may include a home application 536, a contacts application 530, a browser application 532, a book reader application 534, a location application 542, a media application 544, a messaging application 546, a game application 548, and a broad assortment of other applications such as a third-party application 540, The applications 506 are programs that execute functions defined in the programs. Various programming languages can be employed to create one or more of the applications 506, structured in a variety of manners, such as object-oriented programming languages (e.g., Objective-C, Java, or C++) or procedural programming languages (e.g., C or assembly language). In a specific example, the third-party application 540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 540 can invoke the API calls 550 provided by the operating system 512 to facilitate functionality described herein.

Features and aspects of various embodiments may be integrated into other embodiments, and embodiments illustrated in this document may be implemented without all of the features or aspects illustrated or described.

One skilled in the art will appreciate that although specific examples and embodiments of the system and methods have been described for purposes of illustration, various modifications can be made without deviating from the spirit and scope of the present application. Moreover, features of one embodiment may be incorporated into other embodiments, even where those features are not described together in a single embodiment within the present document. Accordingly, the application is described by the appended claims.

What is claimed is:

1. A Bluetooth receiver (100) comprising:
a primary circuit path (P1) comprising:
a low noise amplifier (LNA) (1) to amplify a radio frequency (RF) modulated signal including a Bluetooth signal, a first mixer (2), a first Intermediate Frequency (IF) filter and amplifier (3), a first Analog to Digital (A/D) converter (4), a digital filter and demodulator (5), a synchronizer and depacketizer (6), and an adaptive frequency selector (7) connected in series; wherein the primary circuit path creates a first digital IF modulated signal to obtain a Bluetooth load signal at a current Bluetooth frequency point during a current time slot; and
an auxiliary circuit path (P2), in parallel with the primary circuit path, comprising: a second mixer (12) connected to the LNA, a second IF filter and amplifier (13), a second A/D converter (14), a signal analysis module (15) connected in series;
wherein the auxiliary circuit path creates a second digital IF modulated signal in a Bluetooth frequency range including multiple Bluetooth frequency points, and wherein the signal analysis module evaluates interference levels of the second digital IF modulated signal at the multiple Bluetooth frequency points to choose a number of working Bluetooth frequency points from the multiple Bluetooth frequency points to obtain an Adaptive Frequency Hopping (AFH) channel mapping table.

2. The Bluetooth receiver of claim 1, wherein the signal analysis module obtains a Fourier Transformation (FT) spectrum of the second digital IF modulated signal in the Bluetooth frequency range, analyzes the FT spectrum of the second digital IF modulated signal, ranks the multiple Bluetooth frequency points from low to high as a function of signal strengths at the multiple Bluetooth frequency points in the FT spectrum, and chooses the number of the working Bluetooth frequency points having relatively low signal strengths.

3. The Bluetooth receiver of claim 1, wherein the adaptive frequency selector records the number of the working Bluetooth frequency points in the AFH channel mapping table.

4. The Bluetooth receiver of claim 1, wherein the first mixer, the first IF filter and amplifier, and the first A/D converter of the primary circuit path are configured to produce the first digital IF modulated signal at the current Bluetooth frequency point.

5. The Bluetooth receiver of claim 4, wherein the digital filter and demodulator is configured to filter and demodulate the first digital IF modulated signal to obtain a first digital IF demodulated signal at the current Bluetooth frequency point.

6. The Bluetooth receiver of claim 5, wherein the synchronizer and depacketizer is configured to synchronize the first digital IF demodulated signal at the current Bluetooth frequency point to obtain a Bluetooth packet signal, and to unpack the Bluetooth packet signal to obtain the Bluetooth load signal.

7. The Bluetooth receiver of claim 1, wherein the adaptive frequency selector evaluates an anti-interference capability of the current Bluetooth frequency point.

8. The Bluetooth receiver of claim 1, wherein an automatic gain control (AGC) (8) is connected to the LNA, the first mixer, and the first IF filter and amplifier, and wherein the AGC is connected to the digital filter and demodulator.

9. The Bluetooth receiver of claim 8, wherein the AGC is connected to the second mixer (12), and the second IF filter and amplifier.

10. The Bluetooth receiver of claim 1, wherein a first frequency synthesizer (9) is connected between the first mixer and the adaptive frequency selector.

11. The Bluetooth receiver of claim 1, wherein the second mixer, the second IF filter and amplifier, and the second A/D converter of the auxiliary circuit path produce the second digital IF modulated signal.

12. The Bluetooth receiver of claim 1, wherein a second frequency synthesizer (11) is connected between the second mixer and the adaptive frequency selector.

13. The Bluetooth receiver of claim 1, wherein the LNA is connected to an antenna (10) to receive the RF modulated signal.

14. A computer-implemented method (400) of choosing working Bluetooth frequency points by a Bluetooth receiver, the Bluetooth receiver comprising: a primary circuit path comprising: a low noise amplifier (LNA) to receive a radio frequency (RF) modulated signal including a modulated Bluetooth signal, a first mixer, a first Intermediate Frequency (IF) filter and amplifier, a first Analog to Digital (A/D) converter, a digital filter and demodulator, a synchronizer and depacketizer, and an adaptive frequency selector connected in series, wherein the primary circuit path produces a first digital IF modulated signal at a current Bluetooth frequency point during a current time slot; and an auxiliary circuit path, in parallel with the primary circuit path, comprising: a second mixer connected to the LNA, a second IF filter and amplifier, a second A/D converter, a signal analysis module connected in series; the method comprising:
receiving, by the second mixer of the auxiliary circuit path from the LNA of the primary circuit path, an amplified RF modulated signal;
creating, by the auxiliary circuit path, a second digital IF modulated signal in a Bluetooth frequency range including multiple Bluetooth frequency points by processing the amplified RF modulated signal;
obtaining, by the signal analysis module of the auxiliary circuit path, a Fourier Transformation (FT) spectrum of the second digital IF modulated signal;
evaluating, by the signal analysis module, interference levels respectively at the multiple Bluetooth frequency points by analyzing the FT spectrum to evaluate signal strengths of the second digital IF modulated signal respectively at the multiple Bluetooth frequency points;
ranking, by the signal analysis module, the multiple Bluetooth frequency points based on the interference levels at the multiple Bluetooth frequency points from low to high; and
choosing, by the signal analysis module, a predetermined number of working Bluetooth frequency points from the ranked multiple Bluetooth frequency points having relatively low signal strengths to output to the primary circuit path.

15. The method of claim 14, wherein the signal strengths of the second digital IF modulated signal and the interference levels respectively at the multiple Bluetooth frequency points, except the current Bluetooth frequency point, are proportional.

16. The method of claim 14, further comprising outputting the predetermined number of working Bluetooth frequency points to the adaptive frequency selector of the primary circuit path.

17. The method of claim 14, further comprising recording the predetermined number of working Bluetooth frequency points in an Adaptive Frequency Hopping (AFH) channel mapping table in the adaptive frequency selector of the primary circuit path.

18. The method of claim 14, wherein the first IF filter and amplifier filters the modulated Bluetooth signal to suppress signals out of the current frequency point to obtain a filtered modulated Bluetooth signal at the current frequency point.

19. The method of claim 14, wherein the second IF filter and amplifier filters the RF modulated signal to suppress signals out of the Bluetooth frequency range to obtain a filtered RF modulated signal within the Bluetooth frequency range.

20. The method of claim 14, wherein the digital filter and demodulator filters and demodulates a digital modulated Bluetooth signal to obtain a demodulated Bluetooth signal to output to the AGC and the adaptive frequency selection module.

\* \* \* \* \*